March 20, 1934.  W. C. NABORS  1,951,765
BRAKE MECHANISM FOR VEHICLES
Filed July 9, 1931
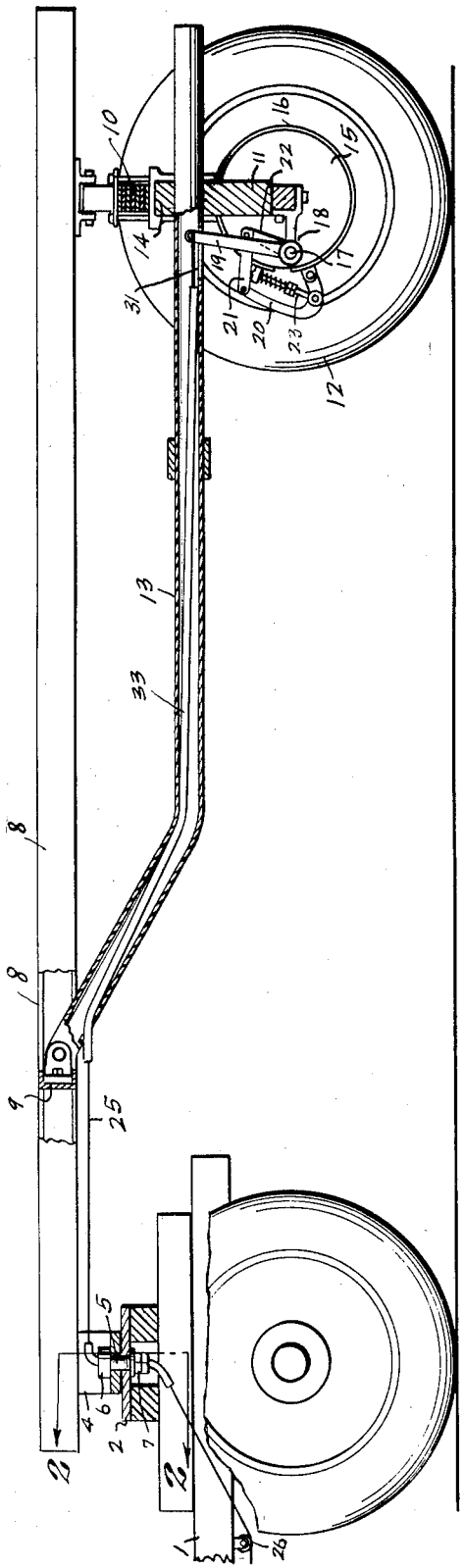
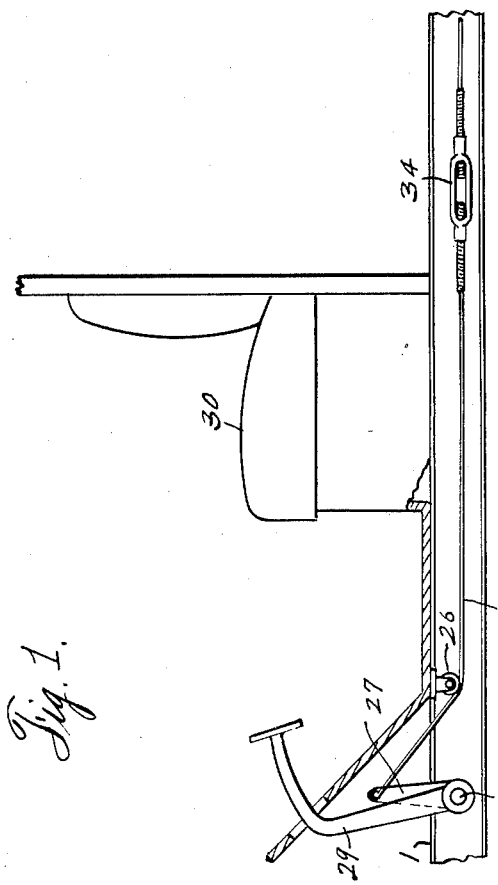
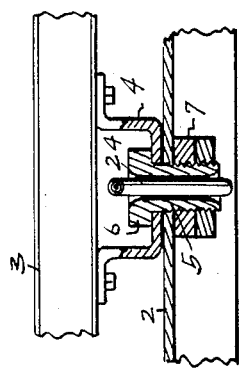
Inventor
William C. Nabors
By Hardway Cathey
Attorneys Patented Mar. 20, 1934

1,951,765

UNITED STATES PATENT OFFICE 1,951,765

BRAKE MECHANISM FOR VEHICLES

William C. Nabors, Mansfield, La.

Application July 9, 1931, Serial No. 549,738

1 Claim. (Cl. 188—3)

This invention relates to brake mechanism for vehicles.

An object of the invention is to provide means whereby the brakes of a trailer, or other drawn vehicle, may be readily controlled by the driver on the tractor or other draft vehicle.

Another object of the invention is to provide in a vehicle brake means whereby the brakes of a drawn vehicle may be controlled by the driver of the tractor or draft vehicle irrespective of the angular relation of said vehicles.

With the above and other objects in view, the invention has particular relation to certain novel features of construction, operation and arrangement of parts, an example of which is given in this specification and illustrated in the accompanying drawing, wherein:

Figure 1 shows a side view of a trailer partly in section, shown coupled to a tractor or a draft vehicle.

Figure 2 shows an enlarged fragmentary sectional view taken on the line 2—2 of Figure 1, and Figure 3 shows a side view of the tractor or other draft vehicle.

Referring now more particularly to the drawing wherein like numerals of reference designate similar parts in each of the figures, the numerals 1, 1 designate the side members of the framework of the tractor. Mounted on the rear end of this framework there is a suitable fifth wheel 2 or other coupling member and depending from the front cross bar 3 of the trailer framework there is a U-shaped bracket 4 which forms in effect an upper fifth wheel which rides on said lower fifth wheel 2. There is a tubular king pin 5 which is fitted downwardly through suitable bearings in said upper and lower fifth wheels and has the head 6 at its upper end which engages the upper fifth wheel and whose lower end is threaded to receive retaining nuts as 7. The trailer framework may be composed of suitable side members 8, 8 preferably formed of channel irons and connected by suitable cross bars as 3, 9. This trailer framework may be of any selected construction, its front end being supported by the bracket 4 and its rear end being supported by the spring 10 which in turn is mounted on the bolster of the axle 11 supported by the wheels 12.

There is a tubular reach pole 13 whose forward end is hinged to the cross bar 9 and whose rear end extends through a suitable bearing 14 in said bolster. This reach pole is secured to the rear axle bolster in any appropriate manner. Each wheel 12 has a brake drum 15 surrounded by a brake band 16 and in front of the axle 11 there is a transverse brake shaft 17 mounted to rotate in the bearings 18 supported by said axle and intermediate the ends of said shaft and fixed thereto there is an upstanding arm 19. There is an arcuate brake arm 20 one end of which is pivotally connected to one end of the brake band 16 and a link 21 connects the other end of said arm 20 to the free end of an upstanding arm 22 carried by the end of the shaft 17. A tension rod 23 is connected at one end to the other end of said brake band and the other end of said tension rod is pivotally connected to an intermediate point of the brake arm 20. Accordingly when the arm 19 is moved forwardly, the brake band 16 will be contracted and the brake set and when said arm is moved rearwardly, the brake band will be released.

Extending through the king pin 5 there is a tubular bearing 24 preferably formed of flexible metallic tubing. There is a cable 25 whose rear end is attached to the arm 19 and this cable extends through the reach pole 13 and through the bearing 24 and continues on up alongside one of the side members 1 operating over the sheaves 26, 26. The forward end of the cable is attached to the free end of the arm 27 which upstands from the pedal shaft 28 fixed to this shaft there is a suitable pedal 29 on the tractor in front of the driver's seat 30.

The upstanding arm 19 works through an oblong slot 31 in the reach pole 13 and so that the cable may be attached thereto and this cable works through, and is protected by, a flexible metallic tube 33 in said reach pole, the forward end of said tube extending through the wall of the forward end of said reach pole as shown in Figure 1.

By depressing the pedal 29 a pull will be exerted through the cable 25 and the trailer brakes may thus be applied in an obvious manner and this irrespective of the angular relation of the drawn vehicle with the respect of the draft vehicle.

The cable 25 is provided with a suitable turnbuckle 34 for making necessary adjustments.

The drawing and description disclose what is now considered to be a preferred form of the invention by way of illustration only, while the broad principle of the invention will be defined by the appended claim.

What I claim is:

In combination with a draft vehicle, a drawn vehicle, and a coupling connecting said vehicles for pivotal movement and having an axial bearing; a tubular reach pole incorporated into said drawn vehicle, a brake mechanism on the drawn vehicle, a flexible tube in said reach pole forming a shield, a flexible connecting member working through said bearing and tube and connecting said controlling device with said brake mechanism.

WILLIAM C. NABORS.